United States Patent
Matsuda

(10) Patent No.: US 9,714,087 B2
(45) Date of Patent: Jul. 25, 2017

(54) WINGED MULTI-ROTOR FLYING CRAFT WITH PAYLOAD ACCOMODATING SHIFTING STRUCTURE AND AUTOMATIC PAYLOAD DELIVERY

(71) Applicant: Hari Matsuda, Nevada City, CA (US)

(72) Inventor: Hari Matsuda, Nevada City, CA (US)

( * ) Notice: Subject to any disclaimer, the term of this patent is extended or adjusted under 35 U.S.C. 154(b) by 79 days.

(21) Appl. No.: 14/583,388

(22) Filed: Dec. 26, 2014

(65) Prior Publication Data

US 2015/0284079 A1    Oct. 8, 2015

Related U.S. Application Data

(60) Provisional application No. 61/975,784, filed on Apr. 5, 2014.

(51) Int. Cl.
*B64C 29/02*    (2006.01)
*B64C 39/02*    (2006.01)

(52) U.S. Cl.
CPC ............ *B64C 29/02* (2013.01); *B64C 39/024* (2013.01); *B64C 2201/028* (2013.01); *B64C 2201/127* (2013.01); *B64C 2201/128* (2013.01); *B64C 2201/141* (2013.01)

(58) Field of Classification Search
CPC ............... B64C 29/02; B64C 29/0016; B64C 2201/088; B64C 2201/108; B64C 2203/00; B64C 39/024; B64D 27/04; B64D 27/06; B64D 27/24
See application file for complete search history.

(56) References Cited

U.S. PATENT DOCUMENTS

| | | | | |
|---|---|---|---|---|
| 1,792,779 A | * | 2/1931 | Tarr ................... | A63H 27/005 244/46 |
| 3,350,035 A | * | 10/1967 | Schlieben ............. | B64C 29/02 244/34 R |
| 4,458,442 A | * | 7/1984 | McDaniel ............. | A63H 27/00 446/66 |
| 5,765,783 A | * | 6/1998 | Albion .................. | B64C 29/02 244/17.23 |
| 6,241,195 B1 | * | 6/2001 | Wagner, III ............. | B64C 3/54 244/139 |

(Continued)

*Primary Examiner* — Tien Dinh
*Assistant Examiner* — Alexander V Giczy
(74) *Attorney, Agent, or Firm* — Jonathan A. Kidney; TechLaw LLP

(57) ABSTRACT

A vertical takeoff/landing capable, multi-engine aircraft with an airfoil without elevator or rudder surfaces is provided. Strut apertures accommodate vertical and horizontal translation of the airfoil in reference to engine supporting struts which are disposed through the apertures, opposite ends of the struts extending to opposite sides of the airfoil, wherein the struts are adjustably attached to the airfoil. A first and second plurality of engines are attached to ends of the struts, an attachment position of the plurality of engines to the struts is horizontally adjustable. A computerized engine controller, controls thrusts of the engines, to enable the aircraft to vertically lift off/land and re-orient itself to horizontally fly, and perform thrust-initiated elevator and rudder emulating flight. An external payload-to-delivery mating mechanism is attached to the bottom of the payload, which mates to a pole leading to the payload receptacle. Transceivers facilitate precise transfer of the payload.

20 Claims, 9 Drawing Sheets

(56) References Cited

U.S. PATENT DOCUMENTS

| | | | |
|---|---|---|---|
| 6,845,939 B1 * | 1/2005 | Baldwin | B64C 29/0033 244/137.1 |
| 7,922,115 B2 * | 4/2011 | Colgren | B64C 9/02 244/120 |
| 2010/0282917 A1 * | 11/2010 | O'Shea | B64C 39/024 244/218 |
| 2011/0260462 A1 * | 10/2011 | Vander Lind | A63H 27/002 290/55 |
| 2013/0105620 A1 * | 5/2013 | Abde Qader Alzu'bi | B64C 27/20 244/17.13 |
| 2014/0263823 A1 * | 9/2014 | Wang | B64C 39/028 244/17.23 |
| 2015/0360775 A1 * | 12/2015 | Arai | B60F 5/02 244/12.1 |
| 2016/0122018 A1 * | 5/2016 | Matsue | B64C 39/024 244/17.13 |
| 2016/0123182 A1 * | 5/2016 | Samaritano | B64C 27/08 416/1 |
| 2016/0244159 A1 * | 8/2016 | Bevirt | B64C 15/00 |
| 2016/0272313 A1 * | 9/2016 | Chan | A63H 27/12 |
| 2016/0304199 A1 * | 10/2016 | Chan | B64C 39/024 |

* cited by examiner

WINGED MULTI-ROTOR FLYING CRAFT WITH PAYLOAD ACCOMODATING SHIFTING STRUCTURE AND AUTOMATIC PAYLOAD DELIVERY

CROSS-REFERENCE TO RELATED APPLICATION(S)

This application claims the benefit of U.S. Provisional Patent Application No. 61/975,784, filed Apr. 5, 2014, the contents of which are hereby incorporated by reference in its entirety.

FIELD

This invention relates to a winged multi-rotor flying craft. More particularly, to a control surfaceless multi-rotor craft with shiftable structures for accommodating larger payloads, as well as automated payload delivery.

BACKGROUND

Much interest has been recently garnered in the field of aviation over the use and control systems of multi-rotor aircraft, specifically for miniature aircraft systems. Specifically, prior art multi-rotor aircraft provide lift and transition to level flight using a rotation of the engine-supporting nacelle (e.g., tilt-rotor) or attached wing and use elevator/rudder control for flight control. Tilting of the wing body (or nacelle) requires rotating assemblies and gearing; and elevator/rudder control requires additional hardware, all of which add to the weight and complexity of a multi-rotor aircraft. The added weight and complexity cannot but help increase the cost of such systems as well as introduce possible mechanical vulnerabilities. Further, all of these designs do not accommodate well the size of the payload, having no variability of the airframe for the payload. And currently there is no cogent paradigm for automating the safe delivery of payloads.

Therefore, there has been a long-standing need in the aircraft community for designs that reduce the complexity and weight of multi-rotor aircraft as well as complementing the designs with secure payload delivery systems. Accordingly, new systems and methods addressing these and other needs are elucidated below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a vertical takeoff/landing capable flying multi-engine aircraft without elevator or rudder surfaces is provided, comprising: at least one lifting airfoil without elevator or rudder surfaces, having strut apertures adapted to accommodate vertical translation and horizontal translation of the airfoil in reference to struts disposed through the apertures; engine supporting struts disposed through the apertures, opposite ends of the struts extending to opposite sides of the airfoil, wherein the struts are adjustably attached to the airfoil; a first plurality of engines attached to an end of the struts, wherein an attachment position of the first plurality of engines to the struts is horizontally adjustable; a second plurality of engines attached to an opposite end of the struts, wherein an attachment position of the second plurality of engines to the struts is horizontally adjustable; and a computerized engine controller, controlling respective thrusts of the first and second plurality of engines to enable the aircraft to vertically lift off/land and re-orient itself to horizontally fly, and perform thrust-initiated elevator and rudder emulating flight.

In another aspect of the disclosed embodiments, the above aircraft is described, wherein the aircraft is a quadrarotor aircraft; and/or wherein the aircraft is a bi-plane aircraft; and/or wherein the airfoil further comprises removable or addable wing extensions; and/or further comprising an externally attached payload, attached to a bottom and center portion of the airfoil; and/or wherein the payload is attached to the airfoil at an incline to the airfoil's surface; and/or wherein the airfoil is translated prior to flight at least horizontally and vertically, to accommodate the payload; and/or wherein the first and second plurality of engines are shifted horizontally, prior to flight; and/or wherein the payload is a surveillance device; and/or further comprising an external payload-to-delivery system transfer mating mechanism, attached to a bottom of the payload.

In yet another aspect of the disclosed embodiments, an automatic payload delivery system using an autonomous aircraft with a payload and a payload receiving receptacle is provided, comprising: a vertical takeoff/landing capable flying multi-engine aircraft without elevator or rudder surfaces, comprising: at least one lifting airfoil without elevator or rudder surfaces, having strut apertures adapted to accommodate vertical translation and horizontal translation of the airfoil in reference to struts disposed through the apertures; engine supporting struts disposed through the apertures, opposite ends of the struts extending to opposite sides of the airfoil, wherein the struts are adjustably attached to the airfoil; a first plurality of engines attached to an end of the struts, wherein an attachment position of the first plurality of engines to the struts is horizontally adjustable; and a second plurality of engines attached to an opposite end of the struts, wherein an attachment position of the second plurality of engines to the struts is horizontally adjustable; a computerized engine controller, controlling respective thrusts of the first and second plurality of engines to enable the aircraft to vertically lift off/land and re-orient itself to horizontally fly, and perform thrust-initiated elevator and rudder emulating flight; an externally attached payload, attached to a bottom and center portion of the airfoil; an external payload-to-delivery system transfer mating mechanism, attached to a bottom of the payload; a location assistance receiver in the aircraft, adapted to provide location accuracy and docking precision for the aircraft when transferring the payload to the delivery system.

In other aspects of the disclosed embodiments, the automatic payload delivery system above is described, further comprising: a payload receptacle; a pole extending from an interior of the receptacle and rising above the payload receptacle; a payload cushion at a terminal end of the payload receptacle, to cushion the payload when entering the payload receptacle; a lockable payload receptacle door; and a location assistance transmitter attached to a top of the pole; and/or wherein the mating mechanism is configured to automatically release the payload from the aircraft when the mating mechanism is attached to the pole; and/or wherein the location assistance receiver in the aircraft and the location assistance transmitter attached to the top of the pole utilize at least one of radio, optic, and sonic signals for mating the payload to the pole; and/or wherein the aircraft is a quadrarotor aircraft; and/or wherein the aircraft is a bi-plane aircraft; and/or wherein the airfoil further comprises removable or addable wing extensions; and/or wherein the payload is attached to the airfoil at an incline to the airfoil's surface; and/or wherein the airfoil is in a first position prior to flight and at a second different position in at least one of horizontally and vertically, to accommodate the payload; and/or wherein the first and second plurality of engines are in a first position prior to flight and in a second different position horizontally, when in flight.

DETAILED DESCRIPTION

In the following description, the use of the term "engine" is understood to be synonymous with any propulsion producing system, capable of producing thrust or force via mechanical means, combustion means, reaction means, and so forth. Therefore, the term engine can refer to any one or more of a propeller-system, turbine-system, rocket-system and so forth.

Various embodiments described herein use multi-engine thrust coordination (increase/decrease thrust of different engines) to provide yaw (roll) and pitch control of a winged, flight control surfaceless multi-engine aircraft. By using at least two separated "upper" engines above the main wing and at least two separated engines below the main wing, via changing thrust ratios of the respective engines, a thrust-induced yaw and pitch can be produced for flight control, as well as producing the necessary flight forces for transitioning from vertical to horizontal flight or vice versus. Further, the exemplary airframe is configured with a "translatable" lift body (e.g., wing) and/or translatable engines, to allow large or small payloads to be easily accommodated, recognizing the payload will be substantially exterior to the airframe and otherwise interfere with typical airframe structures. Accordingly, various embodiments described have applications for package delivery, search and rescue, surveillance, and so forth. Additionally, these aircraft can be networked together for coordinated flight. Aspects of these and other concepts are detailed in the description of the drawings presented below.

Figure 1A:
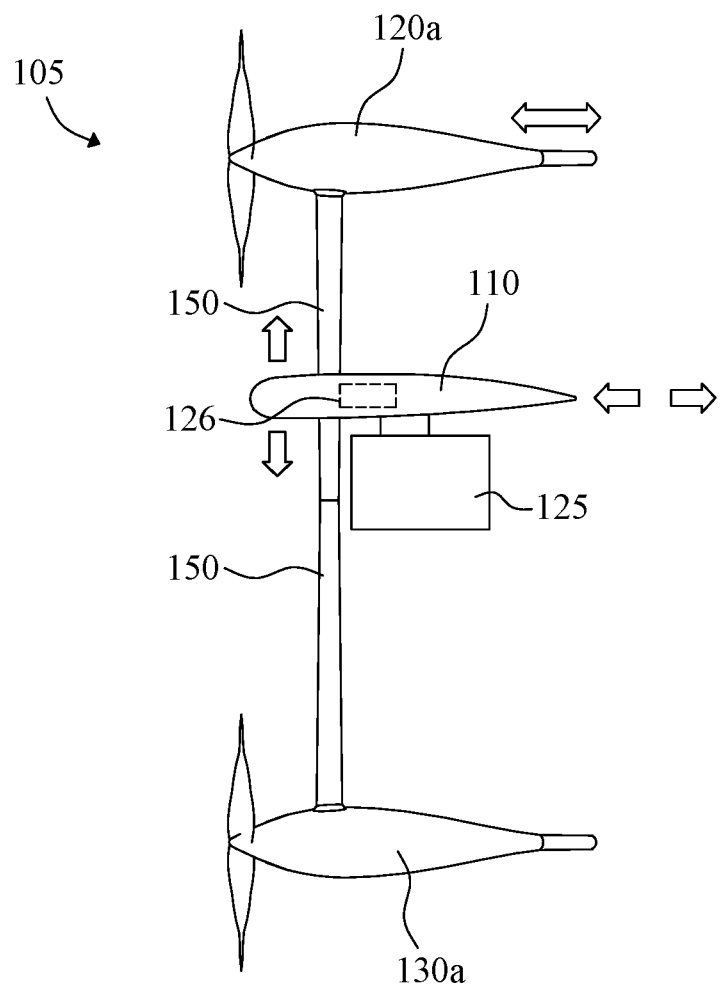
FIGS. 1A-B are side and perspective top view illustrations of a multi-rotor aircraft according to an exemplary embodiment.
Figure 1B:
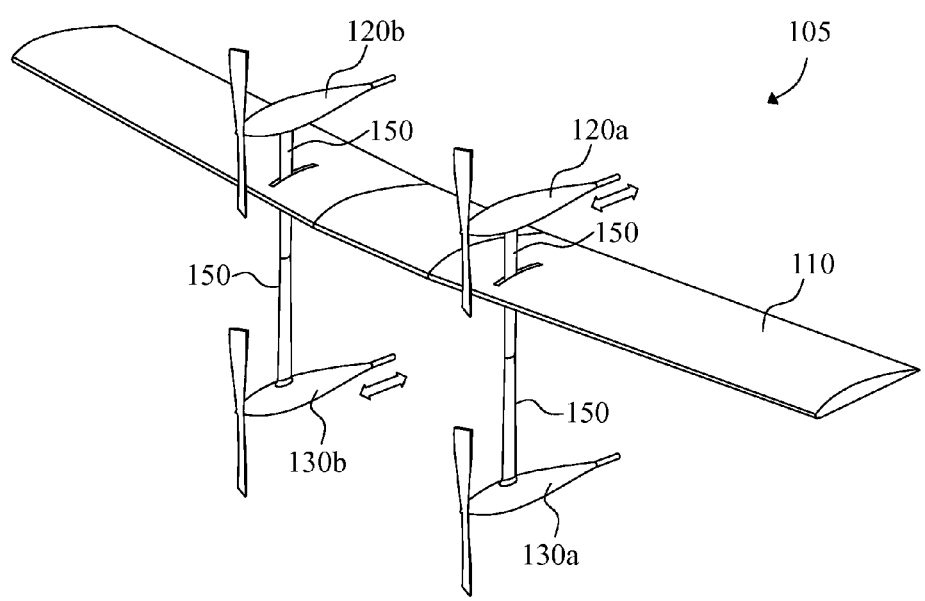

FIGS. 1A-B are side and perspective top view illustrations of a multi-rotor aircraft 105 according to an exemplary embodiment described herein. An airfoil 110 is presented with a first set of thrust producing engines 120a, 120b positioned over a given side (shown here as "above") of the airfoil 110, and a second set of thrust producing engines 130b, 130b positioned over the other side (shown here as "below") of the airfoil 110. Airfoil 110 is a wing with no significant flight control surfaces. That is, no elevator (for pitch) or rudder (for yaw) is used in airfoil 110.

For the purposes of explaining flight operation in an exemplary embodiment, presuming engine pairs 120a,b are operating in concert with engine pairs 130a,b, and the aircraft 105 is in level flight, then if the thrust of engines 120a,b is changed relative to engines 130a,b, then the resulting force differential will produce a pitch effect on airfoil 110—resulting in alternating the attack angle of the airfoil 110, causing aircraft 105 to fly angled upward or downward. For example, if the thrust of lower engine pairs 130a,b is greater than engine pairs 120a,b, then the aircraft 105 will angle upwards and the flight vector will rotate upwards. Alternatively, if the thrust of upper engine pairs 120a,b is greater than engine pairs 130a,b, then the aircraft 105 will angle downwards and the flight vector will rotate downwards. Thus, the equivalent to elevator control surface flight can be achieved, without an actual elevator control surface.

Figure 3A:
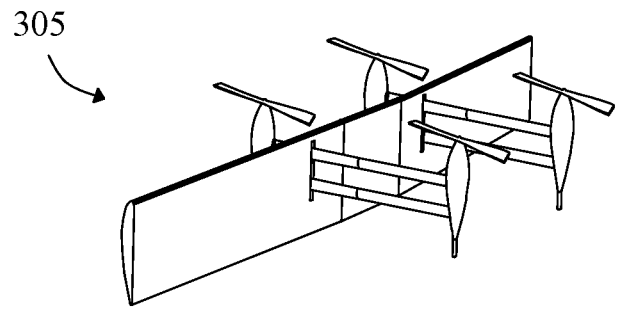
FIGS. 3A-C are illustrations of different orientations of an exemplary aircraft, during a takeoff or landing sequence.
Figure 3B:
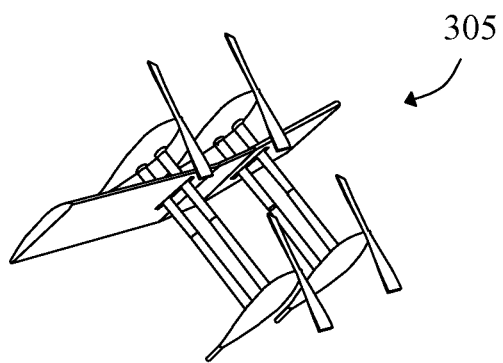
Figure 3C:
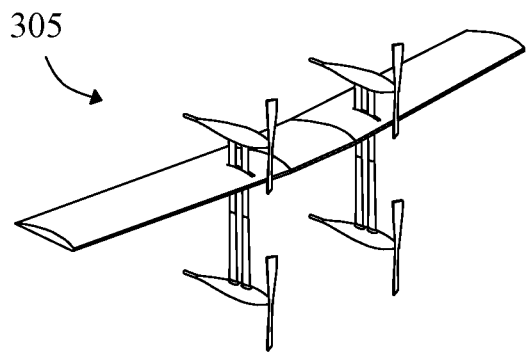

Accordingly, using the appropriate thrusting of engines, the aircraft 105, sitting vertically in a "landed" orientation with either the rear of the engines pairs 120a,b or rear of airfoil 110 operating as landing supports (not shown), can lift off using equal thrust for all engines and then by adjusting the appropriate engines, reorient itself from vertical flight to horizontal flight, thus accomplishing takeoff to horizontal flight orientation. An example of this is seen in FIGS. 3A-C. Of course, landing (transitioning from horizontal flight to vertical/landing orientation) is accomplished in reverse. Thus, the exemplary aircraft can launch vertically like a helicopter, fly horizontally like an airplane and then land vertically like a helicopter. Once the exemplary aircraft is in horizontal flight mode, the thrust could be reduced to maintain airfoil-lift predominate flight, thus reducing the expended energy.

For rudder vectoring, for example, if engine pairs 120a and 130a have different thrusts as compared to opposing engine pairs 120b and 130b, then a yawing force vector will be generated to cause the aircraft 105 to turn left or right. Similarly, for roll vectoring, for example, if a single engine 120a (130b) has a larger/lower thrust than the other engines, then the aircraft 105's airfoil 110 will roll accordingly. Engine thrust control is accomplished through a computer or controller 126 in the aircraft 105. Since flight control will be via computer control of engine thrust, mechanical complexity will be significantly reduced, as well as "only" having the engines as the point of failure, rather than all the other associated systems typically found in conventional aircraft. By using the exemplary thrust control, these prior art systems could be made significantly cheaper, weigh less and the space allocated for the prior art mechanical systems could be allocated for the payload.

While the embodiments described herein are in the context of a four (4) engine aircraft, more than four engines may be used, according to design preference. Further, other aspects of flight vectoring are well understood in the art, therefore additional details, changes, modifications to the embodiments described are within the scope of one of ordinary skill in the art and this disclosure.

The above exemplary configuration is especially interesting in view of the current deluge of prior art quadrarotor drones that are being examined for commercial use. Such prior art systems require movable control surfaces such as an elevator and/or rudder, which inherently require additional mechanical systems, thereby significantly increasing the costs of the system. It is also understood that commercial or commercially sought multi-rotor designs are being contemplated for package (or payload) delivery to individual locations. In essence, as a "personal" courier vehicle. Accordingly, the traditional quadrarotor craft must accommodate the package, which will likely be similar in shape and size to mail delivery packages. But traditional quadrarotor craft (that are "delivery" sized) do not accommodate well larger packages, which interfere with the structures of the airfoil, engines, etc.

Figure 2A:
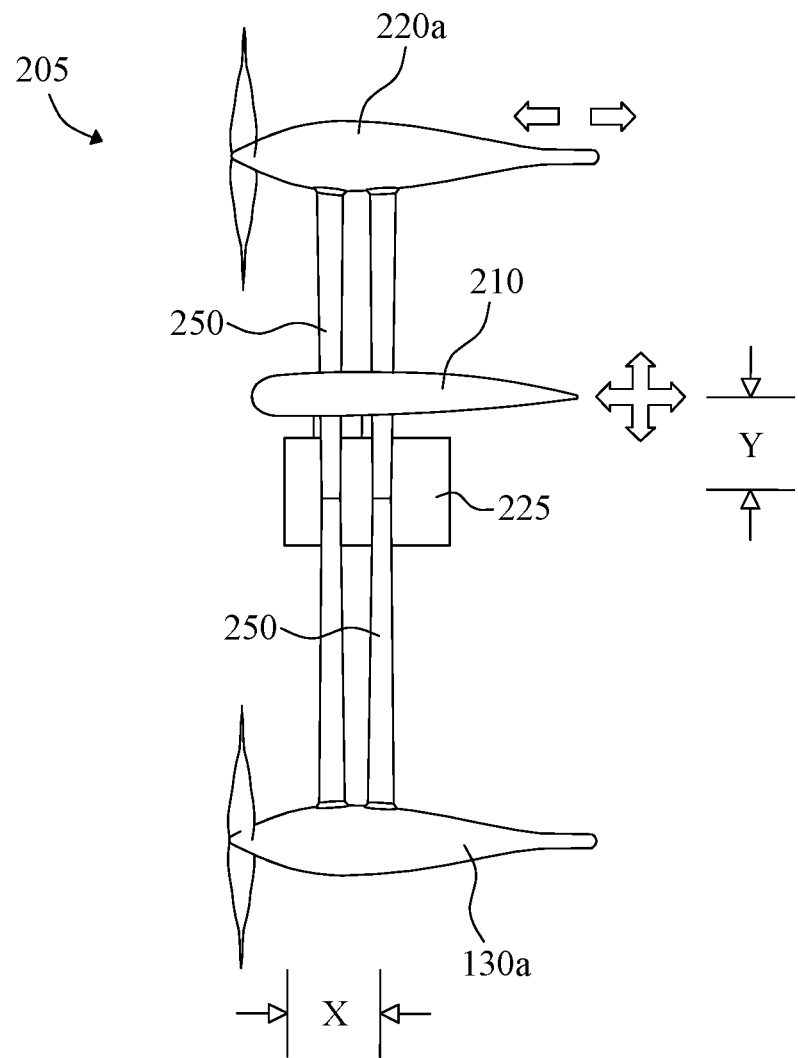
FIGS. 2A-B are side and perspective top view illustrations of a multi-rotor aircraft, with airfoil engines shifted.
Figure 2B:
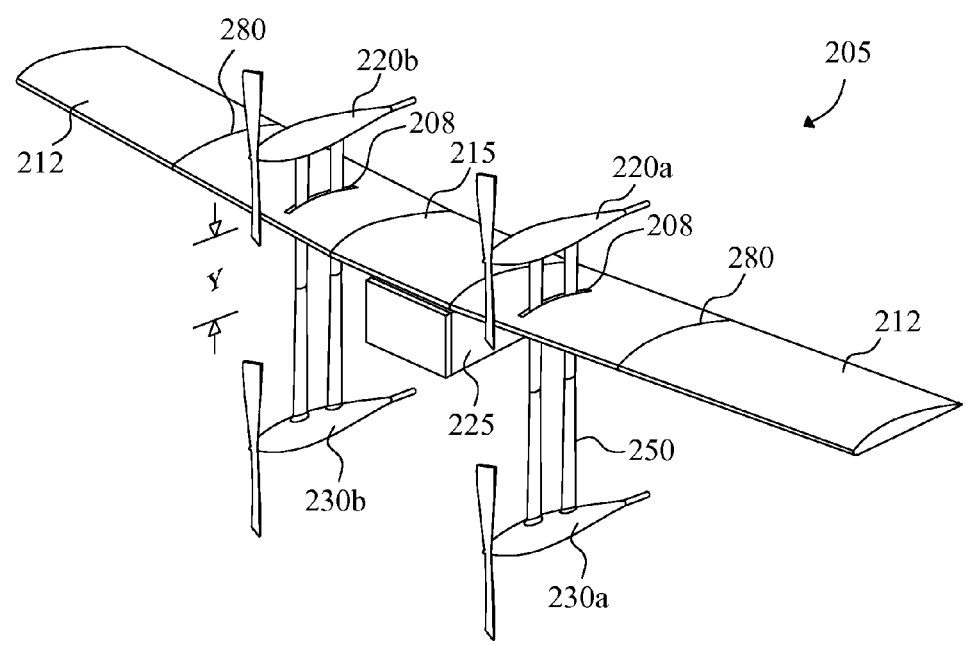

FIGS. 2A-B are side and perspective top view illustrations of a multi-rotor aircraft 205 according to an exemplary embodiment described herein, with airfoil 210 and engines 220a,b or 230a,b shifted. The airfoil 210 contains strut apertures 208 adapted to accommodate vertical translation and horizontal translation of the airfoil 210 in reference to engine struts 250. Airfoil 210 can be elevated or lowered along struts 230 and fixed at this relocated position, to allow more separation space between the airfoil 210 and a given engine pair 220a,b or 230a,b. Also, airfoil 210 can be shifted forward and aft within these airfoil apertures 208. The added separation space can allow for payload 225 that would not normally fit in a mid-airfoil configuration. Thus, instead of requiring a larger quadrarotor aircraft for delivery of larger payloads, the exemplary aircraft 205 can be modified to accommodate the larger payload 225. Of course, altering the airfoil 210 vertical and/or horizontal position will alter the flight characteristics of the aircraft 205. However, it is understood that the unbalancing effects can be compensated by appropriate thrust control of the engines and/or repositioning of the engines, as described below.

In addition to having the airfoil 210 relocatable or shiftable along the vertical and horizontal axes of engine struts 250, the engines 220a,b, 230a,b themselves may also be relocatable or shiftable along the horizontal axes of the engine struts 250. That is, engines 220a,b, 230a,b may shift forward or aft, as needed. The engine relocation allows for rebalancing of the aircraft 205 in view of the altered airfoil 210 position for the payload 260, as well as allowing more room for the larger payload 225, if needed. Additionally, a heavy payload can be compensated for by adjusting the engines' positions to better balance the aircraft's 205 center of gravity over the airfoil 210, for better performing flight. In this FIGS. 2A-B, the symbol "Y" is presented to illustrate the amount of extra space made available by shifting the airfoil 210 upwards along engine struts 250. The symbol "X" represents the shifted amount of engines 220,b, 230a,b from their normal position. It should be noted that airfoil 210 is also forward shifted by an amount similar to "X", so as to better balance load 225.

It should be understood that while the Figs. show the payload 225 below the airfoil 210, it may be desirable to have the payload 225 "above" the airfoil 210. For some implementations, multiple payloads 225 (above and below the airfoil 210, for example) are contemplated.

Recognizing the inherent ability to "move" or shift the airfoil 210 within aircraft 205, for situations where the additional weight of the payload, flight distance required, etc. requires a larger lifting airfoil, various exemplary embodiments may include the ability to easily remove the airfoil 210 from the aircraft 205 and replace it with a larger or longer airfoil. Thus, a separable airfoil 210 that can be easily dismembered from the struts 250 is contemplated. Conversely, the struts 250 may be dismemberable so as to allow airfoil 210 to be separated therefrom.

For example, seams 280 in the airfoil 210 may operate as joining surfaces for outmost left and right sections of the airfoil 210, wherein the center section 215 of airfoil 210 may be the "payload" attaching part, with the outer sections 212 of airfoil 210 being of customizable lengths. Thus, a longer (or shorter) wingspan airfoil 210 can be obtained by attaching the appropriately sized outer sections 212.

The mechanisms to multiply-attach, remove, separate parts of the airfoil 210 and/or struts 250 and/or move the airfoil 210/engines 220a,b, 230a,b, to obtain the abilities described above generally involve simple mechanical attachment technology, which are well within the purview of one of ordinary skill in the mechanical arts. Accordingly, the details of the different attachment/removal schemes are not elaborated, understating that they are within the scope of one of ordinary skill and this disclosure.

FIGS. 3A-C are illustrations of different orientations of an exemplary aircraft 305 with shifted wing, during a takeoff or landing sequence. The aspects of FIGS. 3A-C are self-evident in view of the foregoing discussion, therefore no further elaboration is provided.

Figure 4:
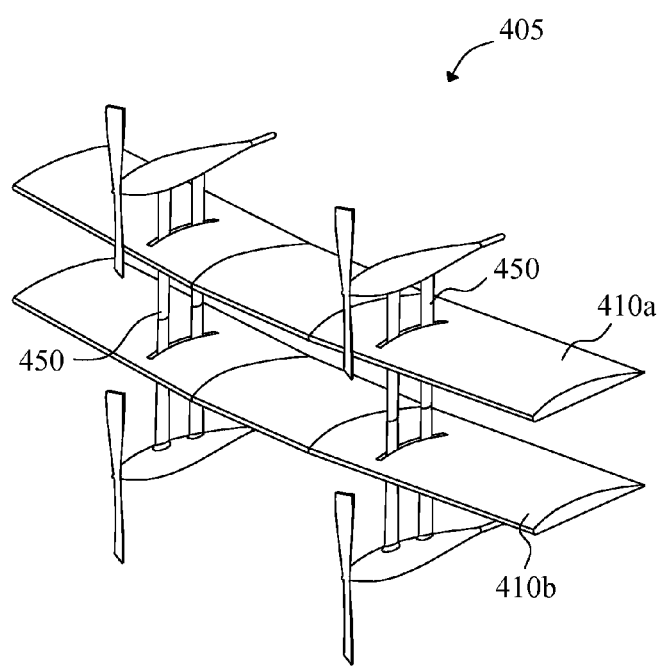
FIG. 4 is an illustration of an exemplary multiple airfoil aircraft.

FIG. 4 is an illustration 400 of an exemplary embodiment of an aircraft 405 with multiple airfoils 410a,b supported by struts 450. This embodiment contemplates the need for an extra airfoil for additional lift in situations where a large wingspan is not appropriate (or for multiple payloads, each connected to a different airfoil). The similar ability for the airfoils 410a,b to be relocatable or shiftable along the vertical and horizontal axes of engine struts 450, and the relocatable/shiftable engines as discussed above, can be implemented herein. Any package or payload can be placed "between" the airfoils 410a,b, or above or below one of them, according to design preference. In some embodiments, the ability to extend the length of the airfoils 410a and/or 410b may be accommodated, by attaching extension segments. While FIG. 4 illustrates two airfoils, it is possible to have more than two (tri-plane), if so desired.

Figure 5:
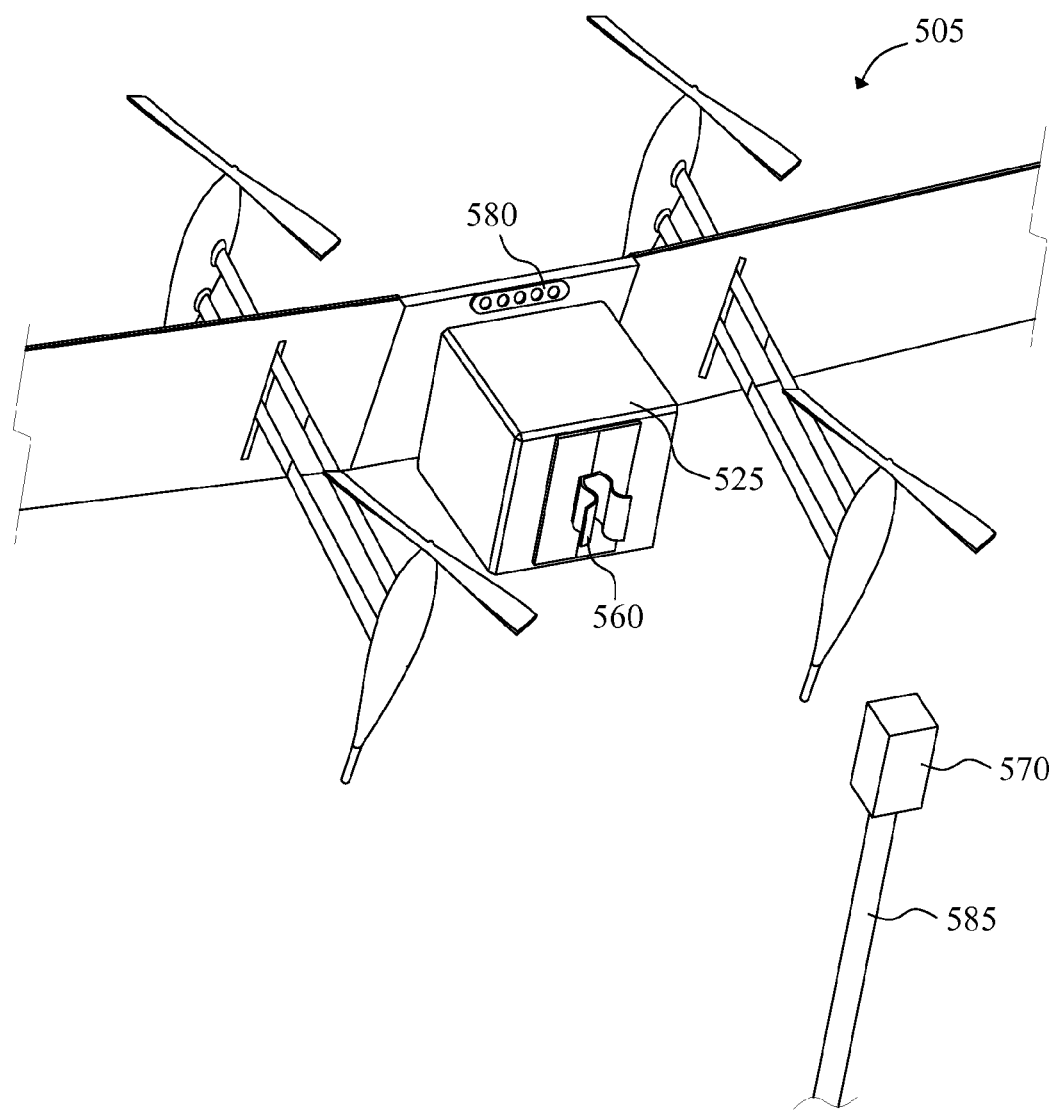
FIG. 5 is a closeup illustration of an exemplary package/payload delivery system.

FIG. 5 is a closeup illustration 500 of an exemplary package/payload delivery system, in accordance with the aircraft embodiments described above. Aircraft 505 contains a payload 525 with a "pole grabber" 560 attached to an exterior of the payload 525. The pole grabber 560 is configured to have a clip-like center catch that is wide enough to attach to pole 585, via simple pressure attachment or other mechanical means. Upon attachment, the payload 525 is released from aircraft 505 and the payload 525 being coupled to pole 585 via pole grabber 560, slides down pole 585 to its destination. A metal, nylon, polypropylene, plastic, or rubber constructed pole grabber 560 may be used, as well as any other type of material or shape that accommodates attachment to pole 585, while allowing the pole grabber 560 to slide on pole 585. In some embodiments, pole grabber 560 may simply be an open ring or loop that slides over the "top" of pole 585. Also, one or more pole grabbers 560 may be used, according to design preference.

The pole grabber 560 may have a triggering mechanism that, when coupled to the pole 585, releases the payload 525 from the aircraft 505. The triggering mechanism can be a "releasable catch" of some sort, spring, lever, pressure or other associated releasing mechanism. In the simplest embodiment, payload 525 may be released simply with the application of sufficient releasing force to break payload 525 from the aircraft's 505 airfoil 510, the payload 525 being attached thereto via some pressure/force-sensitive mechanism. In some embodiments, the end of pole 585 is configured with a stop/antenna 570, that prevents pole grabber 560 from proceeding upward past stop/antenna 570. In this event, the upward motion of aircraft 505 with pole grabber 560, constrained by stop/antenna 570, may provide sufficient force to cause payload 525 to "slide" off its payload-to-aircraft 505 attachment mechanism, thus allowing payload 525 to separate from aircraft 505.

It should be apparent that many methods, schemes, designs can be contemplated for facilitating the dis-engagement of an item (payload) "attached" to supported base (aircraft), therefore these alternative approaches are understood to be within the purview of one of ordinary skill and also within the scope of this disclosure.

In some embodiments, stop/antenna 570 may simply be an antenna, or include an antenna. For example, recognizing that coordinating aircraft 505 to "push" pole grabber 560 to pole 585 requires extreme flying precision, which is not possible using GPS coordinate maneuvering. Thus, to facilitate the pole grabber 560 to pole 585 transfer process, the delivery mating system can utilize a radio or wireless transmitter with an antenna located in stop/antenna 570 (noting that in some embodiments, the stop/antenna 570 functions actually as an antenna rather than a stop). The stop/antenna 570 provides a proximity location signal to aircraft 505, which is configured with a radio/wireless receiver with antenna 580, to receive the proximity signal. Several antennas 580 may be used, according to design preference. Similarly, several antennas may be used in stop/antenna 570. One or more of these antennas may be a phase array, changing beam width, as needed, for precision coordination of the payload 525 transfer.

In operation, for example, aircraft 505 may arrive at the general delivery coordinates using GPS or other navigation system, but since GPS or other navigation systems do not provide the needed precision for point-to-point attachment, the proximity signal provides the needed accuracy. While these embodiments describe an "antenna" means for precise coordination, it is understood that other mechanisms may be utilized without departing from the spirit and scope of this disclosure. For example, an infrared, sonic, optical, other system may be used for "final" approach or "docking" coordination.

Figure 6:
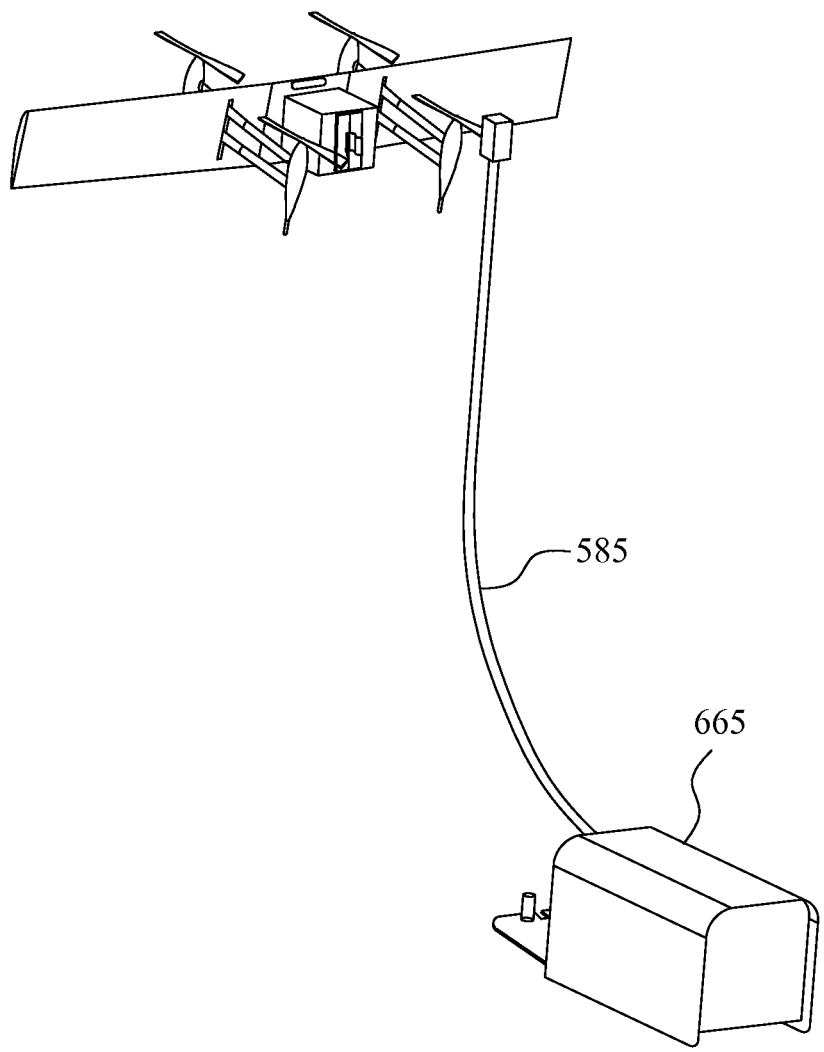
FIG. 6 is an illustration of an exemplary package/payload delivery system.

FIG. 6 is an illustration 600 of an exemplary package/payload delivery system, in accordance with the aircraft embodiments described above, showing the pole 585 leading to a mailbox 665 or other secure payload-securing container. Mailbox 665 can be disposed outside a person's apartment/condo/dwelling/office. Aspects of this Fig. are self-explanatory.

Figure 7:
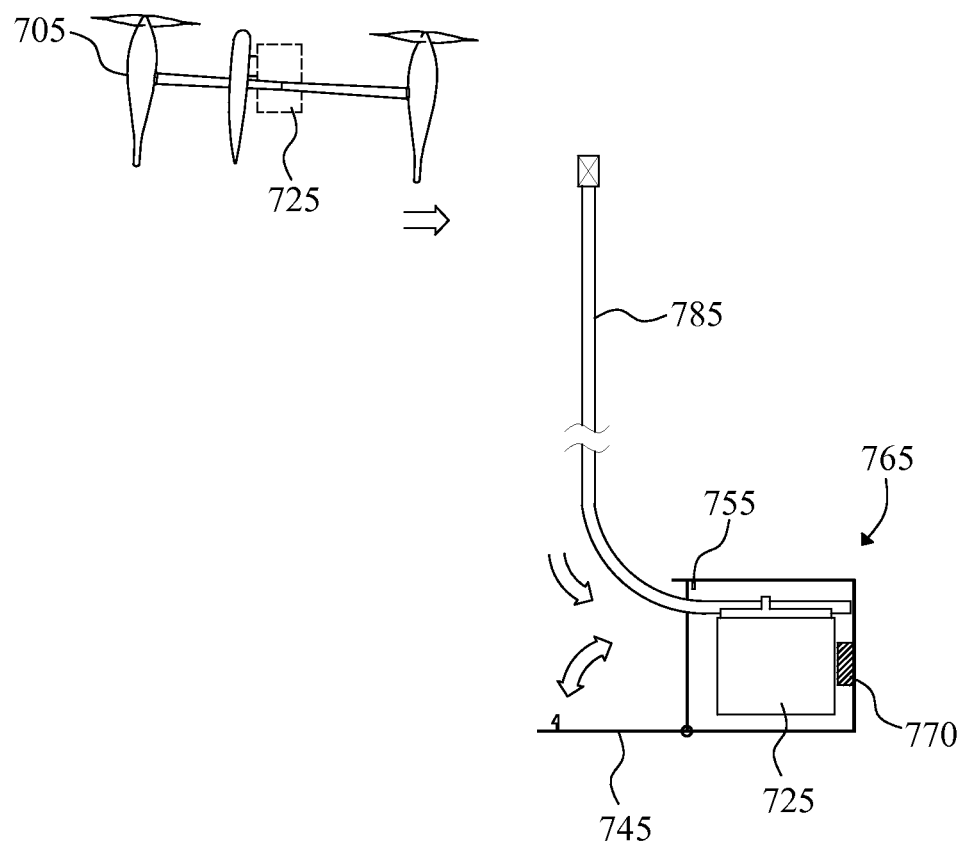
FIG. 7 is an illustration of an exemplary package/payload delivery system.

FIG. 7 is an illustration 700 of an exemplary package/payload delivery system, in accordance with the aircraft embodiments described above. This Fig. shows a cut-away view of the mailbox 765 with payload 725 delivered therein. A cushioning member 770 is shown at an end of mailbox 765 to absorb the payload's 725 impact into mailbox 765. The door 745 to mailbox 765 may be automatically closed upon delivery, with a lock 755 to secure the payload 725.

In some embodiments, aircraft 705 may have payload 725 attached in an inclined manner, to make it easier to orient the payload's pole grabber (not shown) to pole 785, while aircraft 705 is at an angle-attack, attempting to align with pole 785.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A vertical takeoff/landing capable flying multi-engine aircraft without elevator or rudder surfaces, comprising:
   at least one lifting airfoil without elevator or rudder surfaces;
   first and second strut apertures disposed in the airfoil, opposite each other from a vertical bisecting plane of the airfoil;
   struts disposed through the strut apertures, first and second ends of each of the struts disposed on opposite vertical sides of the airfoil, wherein the struts are adjustably attached to the airfoil,
   wherein the strut apertures are adapted to accommodate vertical translation and horizontal translation of the airfoil in reference to the struts disposed through the strut apertures;
   a first plurality of engines attached to the first end of the struts, wherein an attachment position of the first plurality of engines to the struts is horizontally adjustable;
   a second plurality of engines attached to the opposite second end of the struts, wherein an attachment position of the second plurality of engines to the struts is horizontally adjustable; and
   a computerized engine controller, controlling respective thrusts of the first and second plurality of engines to enable the aircraft to vertically lift off/land and re-orient the aircraft to horizontally fly, and perform thrust-initiated elevator and rudder emulating flight.

2. The aircraft of claim 1, wherein the aircraft is a quadrarotor aircraft.

3. The aircraft of claim 1, wherein the aircraft is a bi-plane aircraft.

4. The aircraft of claim 1, wherein the airfoil further comprises removable or addable wing extensions.

5. The aircraft of claim 1, further comprising an externally attached payload, attached to a bottom and center portion of the airfoil.

6. The aircraft of claim 5, wherein the payload is attached to the airfoil at an incline to the airfoil's surface.

7. The aircraft of claim 5, wherein the airfoil is in a first position prior to flight and at a second different position in at least one of horizontally and vertically, to accommodate the payload.

8. The aircraft of claim 7, wherein the first and second plurality of engines are in a first engine position prior to flight and in a second different engine position horizontally, when in flight.

9. The aircraft of claim 5, wherein the payload is a surveillance device.

10. The aircraft of claim 5, further comprising an external payload-to-delivery system transfer mating mechanism, attached to a bottom of the payload.

11. An automatic payload delivery system, comprising:
a vertical takeoff/landing capable flying multi-engine aircraft without elevator or rudder surfaces, comprising:
  at least one lifting airfoil without elevator or rudder surfaces;
  first and second strut apertures disposed in the airfoil, opposite each other from a vertical bisecting plane of the airfoil;
  struts disposed through the strut apertures, first and second ends of each of the struts disposed on opposite vertical sides of the airfoil, wherein the struts are adjustably attached to the airfoil,
  wherein the strut apertures are adapted to accommodate vertical translation and horizontal translation of the airfoil in reference to the struts disposed through the strut apertures;
  a first plurality of engines attached to the first end of the struts, wherein an attachment position of the first plurality of engines to the struts is horizontally adjustable;
  a second plurality of engines attached to the opposite second end of the struts, wherein an attachment position of the second plurality of engines to the struts is horizontally adjustable; and
  a computerized engine controller, controlling respective thrusts of the first and second plurality of engines to enable the aircraft to vertically lift off/land and re-orient the aircraft to horizontally fly, and perform thrust-initiated elevator and rudder emulating flight;
a payload, attached to a bottom and center portion of the airfoil;
an external payload-to-receiver system transfer mating mechanism, attached to a bottom of the payload;
a location assistance receiver in the aircraft, adapted to provide location accuracy and docking precision for the aircraft when transferring the payload to a receiver system.

12. The automatic payload delivery system of claim 11, wherein the receiver system comprises:
a payload receptacle;
a pole extending from an interior of the payload receptacle and rising above the payload receptacle;
a payload cushion at a terminal end of the payload receptacle, to cushion the payload when entering the payload receptacle;
a lockable payload receptacle door; and
a location assistance transmitter attached to a top of the pole.

13. The automatic payload delivery system of claim 12, wherein the mating mechanism is configured to automatically release the payload from the aircraft when the mating mechanism is attached to the pole.

14. The automatic payload delivery system of claim 12, wherein the location assistance receiver in the aircraft and the location assistance transmitter attached to the top of the pole utilize at least one of radio, optic, and sonic signals for mating the payload to the pole.

15. The automatic payload delivery system of claim 11, wherein the aircraft is a quadrarotor aircraft.

16. The automatic payload delivery system of claim 11, wherein the aircraft is a bi-plane aircraft.

17. The automatic payload delivery system of claim 11, wherein the airfoil further comprises removable or addable wing extensions.

18. The automatic payload delivery system of claim 11, wherein the payload is attached to the airfoil at an incline to the airfoil's surface.

19. The automatic payload delivery system of claim 11, wherein the airfoil is in a first position prior to flight and at a second different position in at least one of horizontally and vertically, to accommodate the payload.

20. The automatic payload delivery system of claim 11, wherein the first and second plurality of engines are in a first engine position prior to flight and in a second different engine position horizontally, when in flight.

* * * * *